Patented May 7, 1935

2,000,671

UNITED STATES PATENT OFFICE 2,000,671

ARTIFICIAL SILK FILAMENT

James A. Singmaster, Bronxville, N. Y.

No Drawing. Application June 29, 1929,
Serial No. 374,968

4 Claims. (Cl. 28—1)

My invention relates to the manufacture of artificial silk filaments and has for its object to provide a filament which shall be characterized by a desirable opacity, covering power and lustre and shall also preferably have a desirable softness of texture. In my application filed September 28, 1927, Serial Number 222,685, (which has since issued into United States Patent 1,725,-742, August 20, 1929). I have described and claimed broadly the method of producing a filament of improved opacity and covering power and the filament having these qualities, the process consisting broadly speaking in incorporating with the solution to be spun into a filament by forcing it through a small orifice, distributed particles of inorganic pigment-like material of small area as compared with that of the orifice through which the solution is forced to form the filament and so used as to quantity and distribution as not to impair the continuity of the mass material of the filament. This process is described and claimed in greater elaboration and with various limitations in my supplemental application filed May 8, 1929, Serial Number 361,543, (which has since issued into United States Patent 1,875,-894, September 6, 1932), in which application I have pointed out in more detail the necessary qualities of inorganic pigment-like material usable with advantage in my process and the filament resulting therefrom and I have also described what I believe to be the best method for incorporating and distributing inorganic pigment particles in the solution of the cellulose compound which is to be spun into filaments, pointing out as the best method known to be a thorough admixture of the inorganic pigment particles with the solvent prior to its admixture with the soluble cellulose compound so that in the wetting of this compound by the solvent and the process of dissolving the compound in the solvent the pigment particles will be thoroughly distributed throughout the resulting solution and also pointing out that this distribution is further facilitated and made more complete by passing the solution through the filtering system, which is always employed to free the cellulose solution from such particles as would tend to clog the orifice or to impair the continuity of the mass of the filament. In this supplemental application I have included a schedule of what I believe to be the best inorganic pigment-like materials usable in my process, pointing out as an important qualification that the pigment particles shall not materially exceed .75 microns in size; that they should be of such a character that their light refractive index differs from that of the mass material of the filament in which they are embodied and that for the best results the pigment particles should be substantially white in color and I have specified with regard to the scheduled pigments the relative proportions in which they should be used to produce substantially similar results as to opacity, covering power and lustre in the finished filament and I have specifically claimed in that application the use of titanium oxides in view of the fact that I have found these oxides to give the best results. In my application filed May 18, 1929, Serial Number 364,342, I have described my further invention of a method of manufacturing an improved filament and of the filament so produced in which in addition to incorporating inorganic pigment particles as above described in the solution and the filament, I also incorporate in the filament small particles of an oil or an oleaginous material of such size and distribution that they do not materially impair the continuity and strength of the mass material of the produced filament and the presence of which in the filament I have found to lead to improved results both in the appearance of the filament and in its texture; and I have further described in this application as the best method of obtaining the proper particle size and distribution of the oil that the oil employed should be of such a character that it is soluble in the solvent of the soluble cellulose compound or in a solvent non-reactive with the chemicals employed in the manufacture of the solution so that it will remain in solution in the solution of the cellulose compound and be precipitated in the filament after its formation as the solvent is eliminated therefrom.

The object of my present application is to cover specifically in the process and the produced filament above described the use of zirconium oxide, $ZrO_2$, which inorganic pigment-like material I have found to be advantageously usable both in the described methods and in the resultant products and the protection sought by this application is specifically for the employment of zirconium oxide particles in the described methods and in the filaments produced thereby, such pigment particles being preferably used in the proportion of four percent of the mass material of the cellulose solution to obtain what I may call a standard opacity, covering power and lustre in the produced filament.

While in a broad sense the subject matter of my present application is covered by the broad claims of the copending applications to which I have referred above it is the purpose of this application to specifically claim and protect the use of zirconium oxide in the described way, I having discovered that it is suitable for use by reason of its particle size which may be stated as, when properly prepared, of about 2 microns by reason of the fact that it can be used in sufficient quantity to obtain a desirable opacity and covering power in the filament without materially impairing the continuity of the mass material of the filament, highly desirable opacity and covering power being obtainable by the use of this pigment when used in the proportions of 4 percent by weight to the weight of the solution of cellulose compound with which it is admixed. By reason however of the fact which I have discovered that the soluble cellulose compound containing the distributed particles of zirconium oxide can be subjected to the usual thorough filtering operation without the elimination of the said particles from the solution and by reason of the fact that when the oil solution is mixed with the solution of the cellulose compound in addition to the particles of zirconium oxide the oil will be precipitated in the filament in a separate system of distributed particles to the system of distributed particles of zirconium oxide.

I may note as a further discovery that in cases in which a finely divided oil or oleaginous material adapted to act as a softener is mixed with the solution of the cellulose compound without being dissolved therein that the zirconium oxide also mixed with the solution will be maintained in a separate system of distributed particles and will be found in the filament prepared from such a solution also in a separate system of distributed particles from the system of distributed particles of oleaginous material. This is an important fact when the zirconium oxide particles are incorporated in the solution used in the manufacture of viscose and cupra ammonium silks in which processes it will be found most advantageous to mix the oleaginous material in the solution in a state of finely distributed particles not in solution.

In the case of nitrocellulose solutions and solutions of cellulose acetate it is decidedly advantageous to bring and maintain the oil in a state of solution until the filament is formed.

Having now described my invention, what I claim as new and desire to secure by Letters Patent, is:

1. An artificial silk filament of diminished luster having submerged in and distributed throughout its mass material fine particles of preformed zirconium oxide substantially white in color and having a light refractive index substantially different from that of the mass material, the size of said particles not materially exceeding 0.75 microns and said particles being present in such small quantity and so thoroughly dispersed in the mass material as not to materially impair the continuity of such mass material.

2. An artificial silk filament having immersed in and thoroughly dispersed in its mass material fine particles of zirconium oxide, the quantity and dispersion of such particles being such as not to materially impair the continuity and strength of the mass material of the filament, said filament having also distributed through its mass fine particles of oleaginous material of such size and thorough distribution as not to materially impair the continuity and strength of the mass material of the filament, said oleaginous material being present in amount adapted to soften the filaments.

3. An artificial silk filament of diminished lustre having submerged in and thoroughly distributed throughout its mass material fine particles of zirconium axide pigment, the zirconium oxide pigment being present in such an amount as not materially to impair the continuity and strength of the mass material of the filament.

4. An artificial silk filament according to the preceding claim, in which the zirconium oxide pigment is present in amount not exceeding about 4% by weight of the mass material of the finished filament.

JAMES A. SINGMASTER.